S. J. BLAND.
SUPPORTING AND VENTILATING DEVICE FOR HAYSTACKS.
APPLICATION FILED JUNE 6, 1911.
1,025,778.
Patented May 7, 1912.
2 SHEETS—SHEET 1.
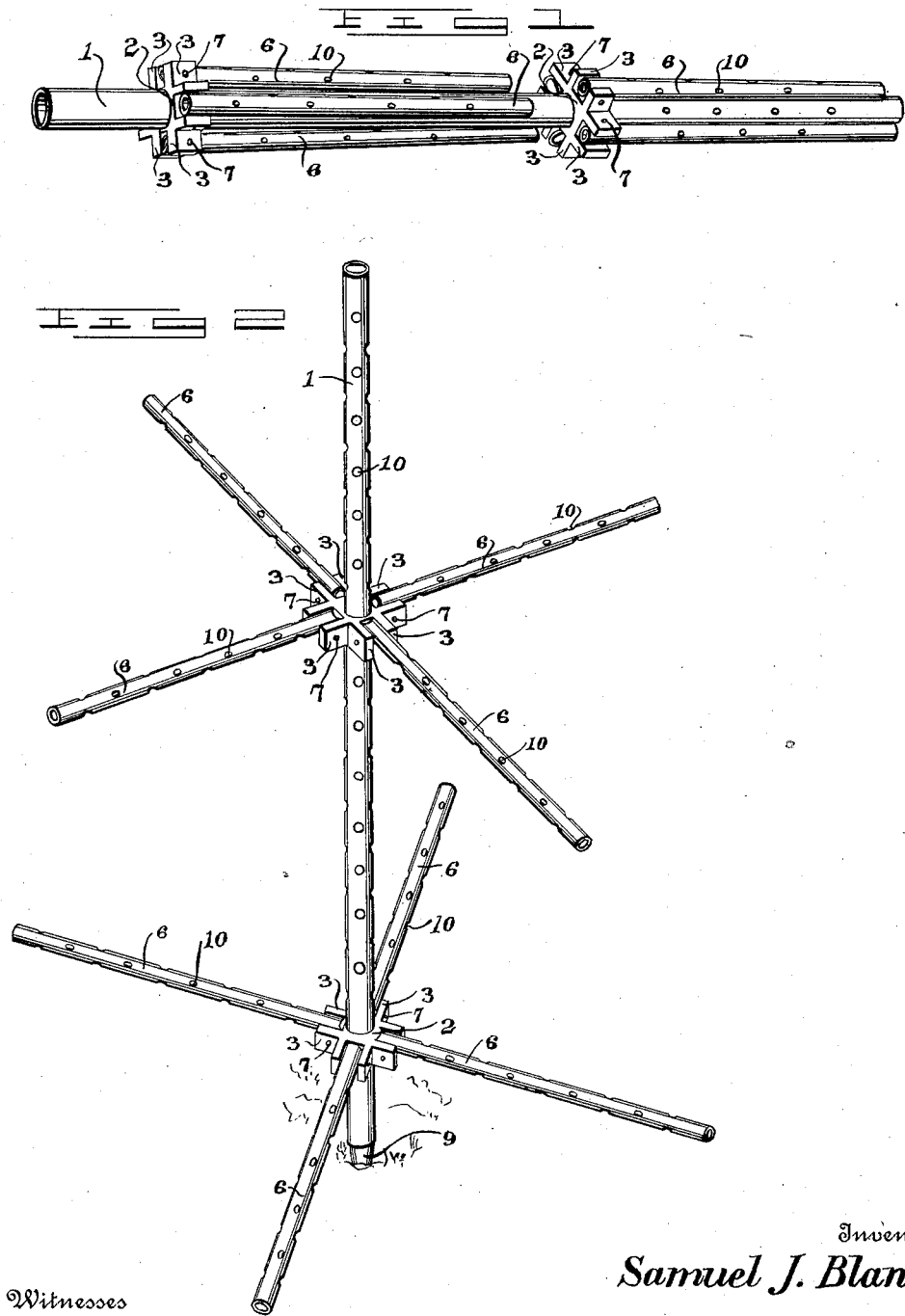
Witnesses
M. F. Garnett
Wm Bagger
Inventor
Samuel J. Bland
By Victor J. Evans
Attorney

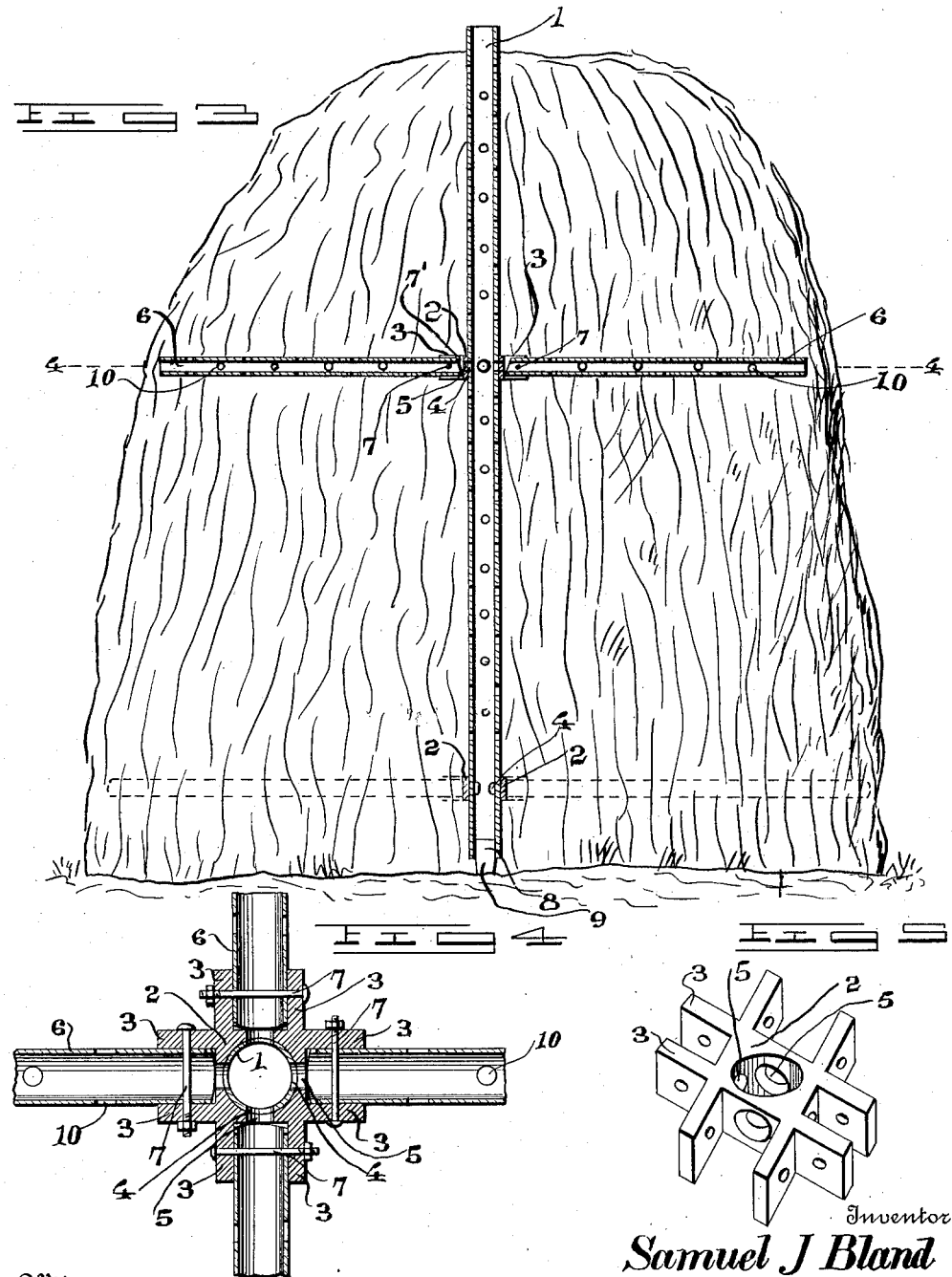

UNITED STATES PATENT OFFICE.

SAMUEL J. BLAND, OF UVALDA, GEORGIA.

SUPPORTING AND VENTILATING DEVICE FOR HAYSTACKS.

1,025,778. Specification of Letters Patent. Patented May 7, 1912.

Application filed June 6, 1911. Serial No. 631,623.

*To all whom it may concern:*

Be it known that I, SAMUEL J. BLAND, a citizen of the United States, residing at Uvalda, in the county of Montgomery and State of Georgia, have invented new and useful Improvements in Supporting and Ventilating Devices for Haystacks, of which the following is a specification.

This invention relates to supporting and ventilating devices for hay stacks, and it has for its object to produce a simple and efficient device of the character described which, when not in use, may be conveniently folded in small compass.

A further object of the invention is to produce a supporting device constructed of tubular members having ventilating openings and connected together in such manner that when hay is piled around the same, it will be supported by the constituent parts of the device, while the latter will act as air ducts, permitting of thorough ventilation of the interior of the stack, thus enabling hay to be cured quickly and in a superior manner and also avoiding the heating of the interior of the stack which frequently results in deterioration of the hay.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a perspective view of a preferred form of the device showing the same folded for storage or transportation. Fig. 2 is a perspective view of the device, showing the same extended for use. Fig. 3 is a vertical sectional view showing the ventilating device applied in operative position with relation to a hay stack which has been built around the supporting device. Fig. 4 is a horizontal sectional view taken on the line 4—4 in Fig. 3. Fig. 5 is a perspective view showing one of the collars used for supporting the hinged tubular arms upon the tubular post or upright, detached.

Corresponding parts in the several figures are denoted by like characters of reference.

The improved device in its preferred form comprises a tubular post or upright 1 which may be of any desired dimensions as to length and diameter. Suitably mounted upon said tubular post are a plurality of collars 2 each of which has a plurality of pairs of parallel brackets 3, 3 diverging therefrom. The collars 2 may be wedged, shrunk or otherwise secured upon the tubular post 1. The latter is provided throughout the length thereof with numerous apertures 4, and each collar 2 is provided intermediate each pair of brackets 3, 3 with an aperture 5 registering with one of the apertures 4. Each pair of brackets 3, 3 serves to support a pivoted tubular arm 6, said arms being pivotally mounted upon bolts 7 that connect the brackets 3, 3. The inner ends of the tubular arms 6 are cut off obliquely, as shown at 7′, thus permitting the said arms to fold upwardly adjacent to the tubular post, while downward movement of said arms beyond a position approximately at right angles to the post will be obstructed by the oblique inner ends of the tubular arms abutting upon the collars 2, as will be best seen in Fig. 3 of the drawings. The lower end of the post 2 engages a plug 8 which is sharpened to form a stake 9 that may be readily driven into the ground for the purpose of supporting the post in an upright position.

In the operation of this device, the upright post 1 is supported upon the stake which has been previously driven into the ground, the pivoted arms 6 being permitted to radiate from the central post or upright, as shown. Said pivoted arms, like the tubular post or upright, are provided with numerous ventilating openings, shown at 10. The inner ends of the arms 6, as will be observed, aline with the openings 5 in the collars that register with the apertures 4 in the post. Hay may now be piled about the support thus formed, and a firm and compact stack may thus be quickly built. Ventilation for the interior of the stack is established through the openings 10 in the arms 6, said arms communicating with the interior of the tubular post through the registering apertures 5, 4. The apertures 4 in the post also assist in providing ventilation for the central portion of the stack. Heated air will thus be conducted from the interior of the stack to the surface or to points near the surface, and a complete ventilation will be established which will be found thoroughly effective in curing the hay in a quick and satisfactory manner. Considered as a supporting device, the post 1, in connection with the pivoted arms 6, serves to solidify the structure of the stack and to decrease the liability of the stack being disintegrated or injured by heavy winds.

The improved device, as will be seen, is extremely simple in construction, and when not in actual use it may be folded in small compass, as indicated in Fig. 1, to enable it to be readily stored for future use.

Having thus described the invention, what is claimed as new, is:—

1. A stack supporting device comprising a tubular post having apertures throughout the length thereof, collars secured on the post and having apertures registering with some of the apertures in the post, and tubular arms hingedly connected with the collars, the inner ends of said arms alining with the registering apertures in the post and the collars, and said arms being provided with apertures throughout the length thereof.

2. A stack supporting and ventilating device comprising a tubular post having apertures throughout the length thereof, collars secured on the post and having apertures registering with some of the apertures in the post, said collars being provided with pairs of brackets extending outwardly therefrom, the brackets of each pair being disposed in parallel relation to one another, and tubular arms hingedly supported between the pairs of brackets, said arms being provided with apertures throughout the length thereof; said tubular arms being cut off obliquely at their inner ends so as to be free to swing upwardly and to abut on the tubular post when said post is in an upright and the said arms in approximately horizontal position.

In testimony whereof I affix my signature in presence of two witnesses.

SAMUEL J. BLAND.

Witnesses:
D. GRAY,
G. T. MASON.

Copies of this patent may be obtained for five cents each, by addressing the "Commissioner of Patents, Washington, D. C."